US007006009B2

(12) United States Patent
Newman

(10) Patent No.: US 7,006,009 B2
(45) **Date of Patent: *Feb. 28, 2006**

(54) SERVICING SYSTEM FOR WELLS

(75) Inventor: Frederic M. Newman, Midland, TX (US)

(73) Assignee: Key Energy Services, Inc., Houston, TX (US)

( * ) Notice: Subject to any disclaimer, the term of this patent is extended or adjusted under 35 U.S.C. 154(b) by 640 days.

This patent is subject to a terminal disclaimer.

(21) Appl. No.: 10/113,609

(22) Filed: Apr. 1, 2002

(65) Prior Publication Data

US 2003/0183382 A1 Oct. 2, 2003

(51) Int. Cl.
*G01V 3/00* (2006.01)

(52) U.S. Cl. .................. 340/854.5; 166/53; 340/853.1; 702/5

(58) Field of Classification Search ............. 340/854.5, 340/856.4, 853.1, 853.9, 870.1, 870.11, 988; 222/1, 618; 417/234; 702/5, 45; 701/207, 701/214; 166/379, 250.15, 369, 52, 53
See application file for complete search history.

(56) References Cited

U.S. PATENT DOCUMENTS 3,760,362 A 9/1973 Copland et al.
3,921,152 A 11/1975 Hagar et al.
4,187,546 A 2/1980 Heffernan et al.
4,393,485 A 7/1983 Redden
4,531,204 A 7/1985 Vanderschel
4,545,017 A 10/1985 Richardson
4,604,724 A 8/1986 Shaginian et al.
4,794,534 A 12/1988 Millheim
4,896,580 A 1/1990 Rudnicki ................... 89/1.815
4,916,617 A 4/1990 Norwood
5,014,206 A * 5/1991 Scribner et al. ............ 701/207
5,051,962 A 9/1991 Eaton
5,132,904 A 7/1992 Lamp
5,216,638 A 6/1993 Wright
5,237,539 A 8/1993 Selman
5,278,549 A 1/1994 Crawford
6,079,490 A 6/2000 Newman ................. 166/77.51
6,097,316 A 8/2000 Liaw et al. ................. 340/988
6,164,493 A 12/2000 Shelton, Jr. ..................... 222/1
6,209,639 B1 4/2001 Newman ............... 166/250.01
6,212,763 B1 4/2001 Newman ...................... 29/702
6,213,207 B1 4/2001 Newman ............... 166/250.01

(Continued)

FOREIGN PATENT DOCUMENTS

GB 2365895 A 2/2002

OTHER PUBLICATIONS

Walbe, Kim A., Walbe & Associates, Inc. SPE 30985. "Satellites and the Oilpatch or, Resolving the Heckarewe Problem." (pp. 97-100).

(Continued)

*Primary Examiner*—Brent A. Swarthout
(74) *Attorney, Agent, or Firm*—King & Spalding, LLF

(57) ABSTRACT

A well servicing system includes a computer-based system that monitors pumping or other service operations at a well site and monitors deliveries and withdrawals of chemicals at a bulk storage station. A GPS device or other location identifier provides a location value that identifies the location of the service vehicle. A GPS reading is triggered by actuation of the vehicle's parking brake, and the location value is recorded in association with a process-related transducer value. The transducer value is based on the service vehicle performing some type of service operation either at the well site or at the bulk storage station.

74 Claims, 3 Drawing Sheets

U.S. PATENT DOCUMENTS

| | | | | |
|---|---|---|---|---|
| 6,241,020 | B1 | 6/2001 | Newman | 166/250.01 |
| 6,253,849 | B1 | 7/2001 | Newman | 166/255.1 |
| 6,276,449 | B1 | 8/2001 | Newman | 166/53 |
| 6,374,706 | B1 | 4/2002 | Newman | 81/57.34 |
| 6,377,189 | B1 | 4/2002 | Newman | 340/854.6 |
| 6,728,638 | B1 * | 4/2004 | Newman | 702/5 |
| 2001/0018639 | A1 | 8/2001 | Bunn | 701/214 |
| 2002/0052687 | A1 | 5/2002 | Doyle | 701/207 |
| 2002/0156582 | A1 | 10/2002 | Newman | 702/5 |
| 2002/0156591 | A1 | 10/2002 | Newman | 702/45 |
| 2002/0156670 | A1 | 10/2002 | Newman | 705/9 |
| 2002/0156730 | A1 | 10/2002 | Newman | 705/40 |
| 2003/0042020 | A1 | 3/2003 | Newman | 166/250.15 |

OTHER PUBLICATIONS

International Search Report, European Patent Office. International Patent Application Serial No. PCT/US03/09722. Aug. 4, 2003.

* cited by examiner

SERVICING SYSTEM FOR WELLS

BACKGROUND OF THE INVENTION

1. Field of the Invention

The invention generally pertains to a system for servicing wells, and more specifically to a system that monitors various work at various locations.

2. Description of Related Art

Wells for drawing petroleum, water or other fluids up from within the ground periodically need servicing to maintain the well in good operating condition. Such servicing may involve pumping various chemical treatments into the well or replacing worn parts, such as tubing or sucker rods. Since wells are often miles apart from each other, the maintenance or service operations are usually performed by a service vehicle having special onboard servicing equipment, such as a pump or hoist for assisting in performing the work.

The service vehicle for chemical treatments usually includes several shipping tanks that each contains a different chemical for various treatments. Some examples of such chemicals include water, scale inhibitor, emulsion breaker, bactericide, paraffin dispersant, and antifoaming agent.

The service vehicle usually fills its shipping tanks with chemicals that are stored in several large storage tanks at a bulk storage station. When the liquid level in a storage tank gets low, a large tanker truck comes to the bulk storage station to refill the tank. With ongoing arrivals and departures of various tankers of different companies and various service vehicles of different companies, it can become difficult to monitor deliveries, withdrawals and inventory levels of the many chemicals at the bulk storage station. And for the companies that own or operate the various wells, it can difficult confirm that a particular service vehicle actually provided the correct chemical treatment for their wells.

Currently, there are systems being developed to help address certain aspects of this problem. For example, U.S. patent application Ser. No. 09/945,924 (specifically incorporated by reference herein) describes a system that monitors the pumping operations at various wells. However, the system does not consider what occurs at a bulk storage station, and the system relies on an operator's ability to correctly identify the well being serviced. U.S. patent application Ser. No. 09/281,864 (specifically incorporated by reference herein) suggests a method of identifying various well sites. Although the method is less susceptible to operator error, it is not foolproof.

SUMMARY OF THE INVENTION

One object of some embodiments of the invention is to provide an improved system for monitoring operations at a well site and/or a bulk storage station.

A second object of some embodiments is to use a GPS device to identify a well site.

A third object of some embodiments is to use a GPS reading with a transducer reading that pertains to a service operation performed at a well site, wherein the GPS reading helps identify the well site and the transducer is a pressure sensor, flow meter, counter, or an identifier of valve actuation.

A fourth object of some embodiments is to use a computer-based system for clarifying the association of the GPS reading with the transducer reading.

A fifth object of some embodiments is to trigger the reading of a GPS device using a parking brake of a vehicle to minimize operator error.

A sixth object of some embodiments is identify a well site by latitude/longitude, an API number, or a well name.

A seventh object of some embodiments is gather information on operations that occur at remote locations and display the information collectively on an output, such as a printed report, computer monitor or display.

An eighth object of some embodiments is to present the output on a display that is tolerant of heat and sunlight, which is especially common in Texas.

A ninth object of some embodiments is to create the output where it may be needed, such as directly at the well site or at a remote location.

A tenth object of some embodiments is to transfer data for the output in various modes of data transfer, such as hand carrying a PDA device, transporting a portable computer, transporting an optical or magnetic memory disc, transporting a data logger, etc.

An eleventh object of some embodiments is to provide a service system for wells that can be applied to various service vehicles, such as those transporting shipping tanks or a hoist.

A twelfth object of some embodiments is to use a service vehicle's engine for assisting in performing the service operation, and then monitor the engine's rotational speed.

A thirteenth object of some embodiments is to monitor the deliveries and withdrawals of chemicals from a bulk storage station.

A fourteenth object of some embodiments is to track employee identification values and company identification values for tankers or service vehicles operating at a well site or bulk storage station.

A fifteenth object of some embodiments is to track employee identification values and company identification values by inputting such values into a computer-based system via a barcode scanner, keyboard, or RFID device.

Some or all of these objects are provided by a well servicing system that includes a computer-based system that monitors operations at a well site and/or bulk storage station, wherein a GPS device or other location identifier provides a location value that can be associated with a process-related transducer value, and the two values are displayed on an output determined by the computer-based system.

DESCRIPTION OF THE PREFERRED EMBODIMENT

Figure 1:
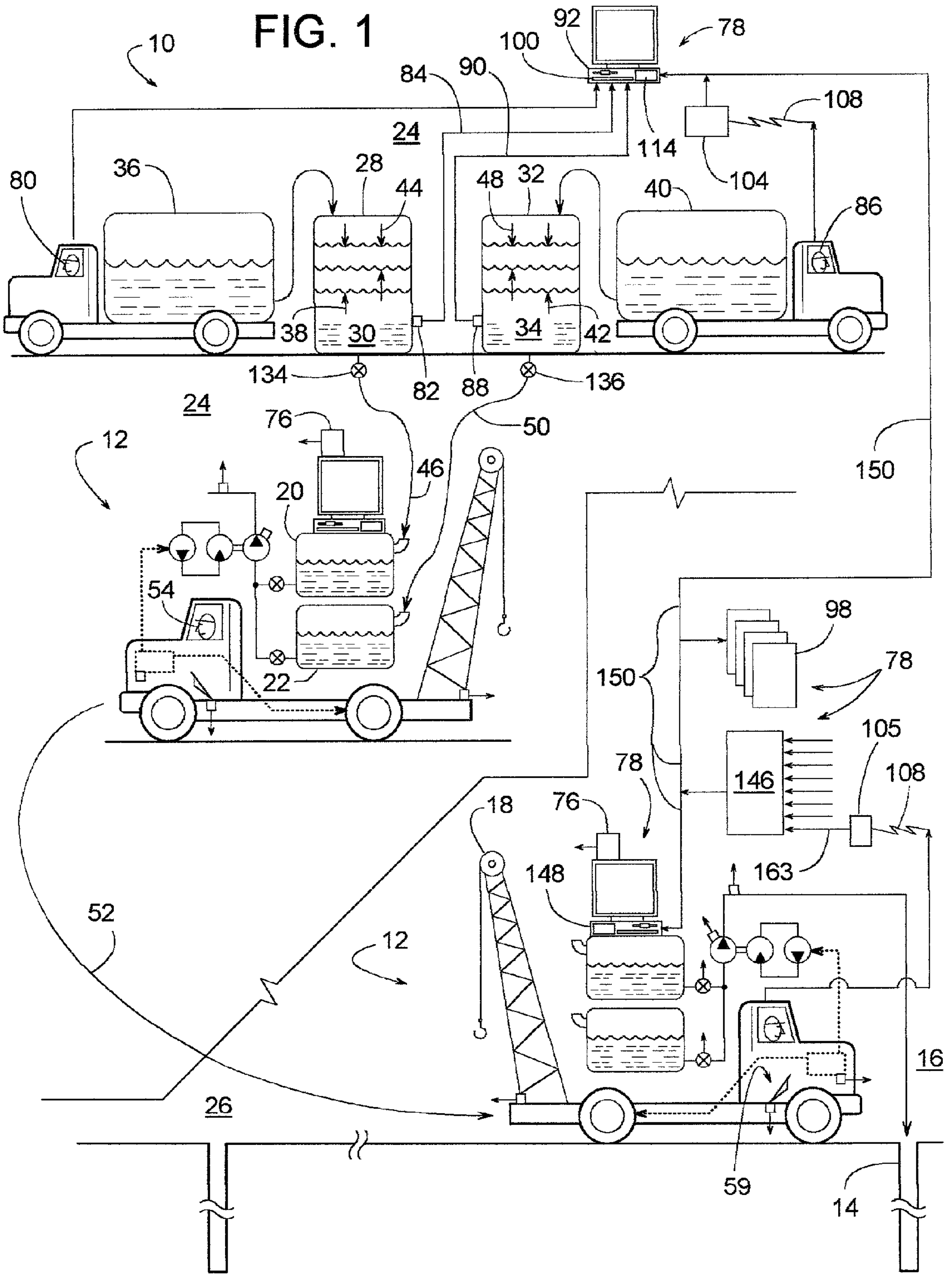
FIG. 1 is a schematic diagram of a well servicing system.
Figure 2:
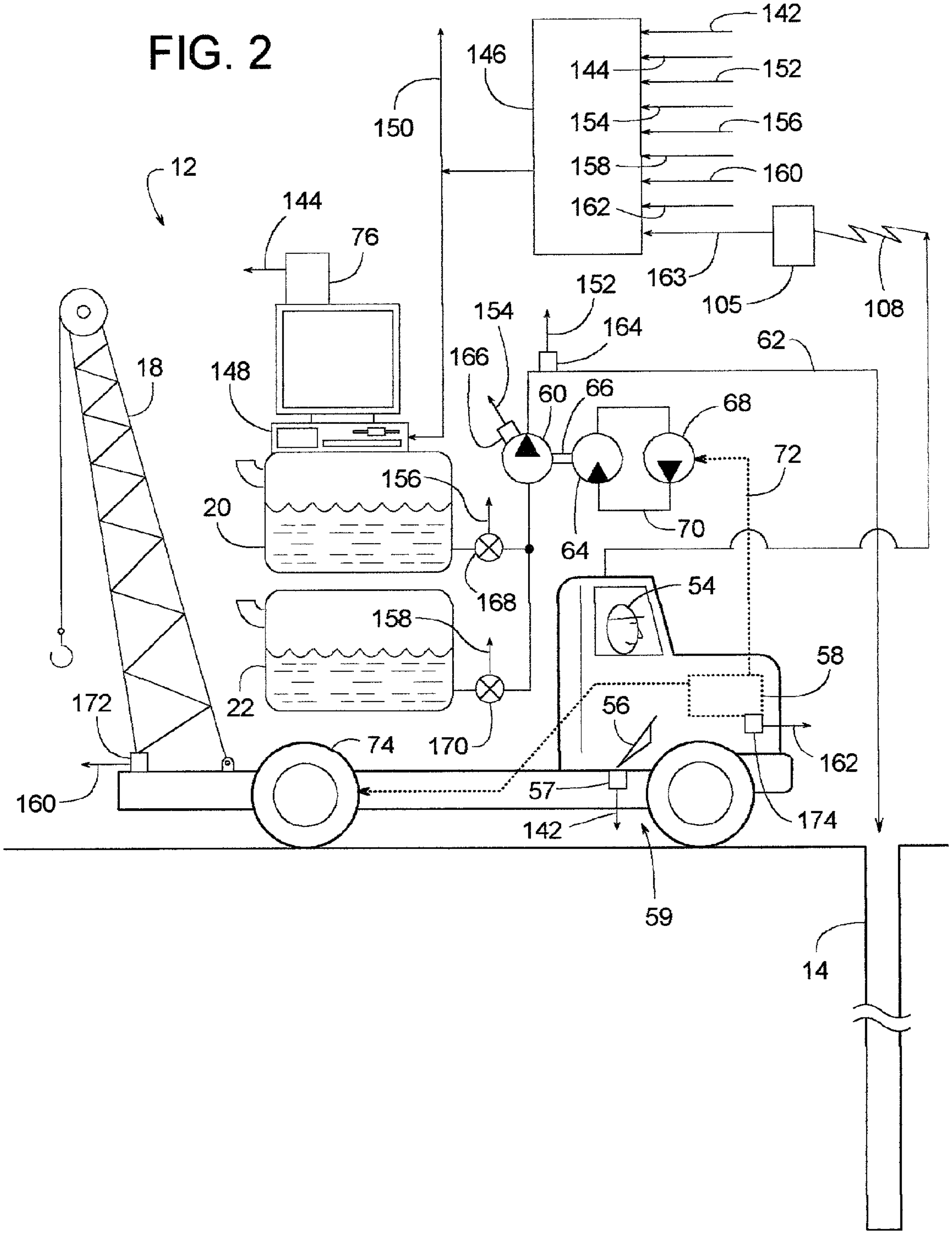
FIG. 2 is a schematic diagram of a service vehicle.

FIGS. 1 and 2 illustrate a well servicing system 10 that includes a service vehicle 12 for assisting in performing a service operation on a well 14 at well site location 16. The term, "service operation" refers to any work that changes a well's condition. Examples of a service operation include, but are not limited to, pumping operations and hoist-assisted mechanical work. Examples of hoist-assisted mechanical work include, but are not limited to replacing worn parts, such as a pump, sucker rods, inner tubing, and packer glands. Examples of pumping operations include, but are not limited to, forcing various fluids down into the well, such as a chemical, water, scale inhibitor, emulsion breaker, bactericide, paraffin dispersant, antifoaming agent, hot oil, mud, and cement.

Service vehicle 12 is schematically illustrated to represent any type of vehicle that is appropriately equipped to assist in performing a service operation. Some examples of vehicle 12 include, but are not limited to, a chemical tank truck or trailer, a cement truck or trailer, a hot-oiler tank truck or trailer, and a mobile work-over service rig having a hoist 18 for removing and installing well components (e.g., sucker rods, tubing, etc.). For illustration, vehicle 12 is shown to include hoist 18 for hoist-assisted mechanical work plus two shipping tanks 20 and 22 for pumping operations. In reality, however, service vehicle 12 would typically actually only have one or the other: a hoist or a plurality of shipping tanks.

In order to perform a service operation, service vehicle 12 may travel between well site location 16 and a remote location, such as a bulk storage station 24 and/or a second well site 26. The term, "remote" refers to a separation distance of at least one mile. Before delivering chemicals to various well sites, vehicle 12 may first need to travel to bulk storage station 24 to fill the vehicle's shipping tanks 20 and 22 with chemicals.

Bulk storage station 24 may include several large storage tanks for storing several different chemicals. In a simplified example, bulk storage station 24 includes a first storage tank 28 holding a first stored amount 30 of a chemical-A (e.g., water, scale inhibitor, emulsion breaker, bactericide, paraffin dispersant, antifoaming agent, etc.) and a second storage tank 32 holding a second stored amount 34 of a chemical-B (e.g., water, scale inhibitor, emulsion breaker, bactericide, paraffin dispersant, antifoaming agent, etc.). A first tanker 36 may arrive at station 24 to pump or otherwise deposit a first incremental amount 38 of chemical A from first tanker 36 into first storage tank 28. Likewise, a second tanker 40 may arrive at station 24 to pump or otherwise deposit a second incremental amount 42 of chemical-B from second tanker 40 into second storage tank 32.

Service vehicle 12 may arrive at bulk station 24 to receive a first extracted amount 44 of chemical-A from first storage tank 28 into first shipping tank 20, as indicated by arrow 46. Vehicle 12 may also receive a second extracted amount 48 of chemical-B from second storage tank 32 into second shipping tank 22, as indicated by arrow 50. Once service vehicle 12 is supplied with chemicals, vehicle 12 may travel, as indicated by arrow 52, to various well sites to pump the chemicals into various wells, such as well 14 at well site 16.

At well site 16, a truck driver 54 (FIG. 2) may manually set a parking brake 56 of vehicle 12 to help hold vehicle 12 in place while its engine 58 may continue running. The term, "parking brake" refers to any device on a vehicle that inhibits or limits a wheel of the vehicle from rotating even though the vehicle's engine may be running. A liquid pump 60 may begin pumping chemical-A and chemical-B either sequentially or as a mixture into well 14, as indicated by arrow 62. In some cases, chemical-A may be entirely or mostly water and chemical-B may be a concentrated chemical that is mixed with the water to provide a more dilute solution suitable for well 14. In other cases, chemical-A may be a chemical treatment and chemical-B is water. Chemical-A may be pumped into well 14 at full strength followed by a water flush.

In some cases, liquid pump 60 is driven by a hydraulic motor 64 via a mechanical connection 66. Hydraulic motor 64, in turn, is driven by a hydraulic pump 68 through a conventional hydraulic circuit 70. Hydraulic pump 68 can be driven by engine 58 of vehicle 12, as indicated by arrow 72. After the pumping operation is complete and brake 56 is released, engine 58 can be operatively engaged with wheel 74 to propel vehicle 12 to its next destination.

The location of the vehicle's various destinations can be identified by way of a GPS device 76 that is transported by vehicle 12. GPS device 76 provides a GPS signal 144 that when carried by vehicle 12, indicates the vehicle's location. The term, "GPS device" refers to any positioning system that includes a receiver whose general location or global coordinates are determined based on wireless communication between the receiver and one or more known references, such as satellites, antennas, transmitters, or other predetermined references. Device 76 is schematically illustrated to represent any GPS device; however, one specific example of device 76 is a model S-Vee-8 by Trimble Navigation, Ltd. of Sunnyvale, Calif.

To provide an ongoing record of chemical inventories or to monitor operations, arrivals, or departures of various vehicles at bulk storage station 24 or various well sites, well servicing system 10 includes a computer-based system 78 that is electrically coupled to GPS device 76 and/or one or more transducers.

To determine that vehicle 12 has reached a particular destination, such as well site 16, well site 26, bulk storage station 24, or even a restaurant or tavern, a reading of GPS device 76 (i.e., a reading, registering, or recording of GPS signal 144) can be initiated or triggered by actuation of a parking brake system 59 upon reaching the destination. Parking brake system 59 includes parking brake 56 and a switch 57 responsive thereto. Many existing parking brakes already include a limit switch for actuating a "brake on" indicator light on the dash of the vehicle. Such a limit switch (operating directly or through a relay or voltage divider) may be used as switch 57 for providing a signal 142 that initiates or triggers the reading of GPS device 76, or the parking brake may be provided with a separate switch dedicated for triggering the GPS reading. In some embodiments, GPS signal 144 and signal 142 are conveyed to computer-based system 78, whereby system 78 registers (e.g., records or stores) a reading of GPS signal 144 upon receiving signal 142.

The term, "computer-based system" refers to any system that includes a data device for collecting, manipulating, converting, and/or storing digital data. Examples of a data device include, but are not limited to, a personal computer, PC, desktop computer, laptop computer, notebook computer, handheld computer, portable computer, PDA device (e.g., a personal digital assistant, such as a PALMPILOT by Palm Inc. of Santa Clara, Calif.), PLC (programmable logic controller), data logger (e.g., a "POCKET LOGGER" by Pace Scientific, Inc. of Charlotte, N.C.), magnetic memory disc (e.g., floppy disc), an optical disc (e.g., CD or DVD), IC memory device (e.g., flashcard), etc.

Computer-based system 78 is schematically illustrated to represent all types of computer-based systems that can be electrically coupled to GPS device 76 and/or one or more transducers. The term, "electrically coupled" refers to two electrical devices being able to transfer a signal or information from one electrical device to the other either by way of electrical wires or by way of a wireless communication link (e.g., electromagnetic waves, light beam, infrared, microwave, etc.). Computer-based system 78 and its relationship with GPS device 76 and various transducers will now be explained by describing what may occur at bulk-storage station 24 and well site 16.

At bulk storage station 24, a first trucker 80 driving first tanker 36 may arrive to deposit first incremental amount 38 of chemical-A into first storage tank 28. A first transducer 82 provides a first signal 84 that indicates how much of chemical-A was added to first tanker 28. Transducer 82 is schematically illustrated to represent any sensor that can provide a signal in response to changing the amount of chemical-A in first storage tank 28. Examples of transducer 82 include, but are not limited to, an electronic liquid level indicator, a flow meter sensing flow entering the tank, and a pressure sensor or strain gage sensing the liquid head in the tank.

Similarly, a second trucker 86 driving second tanker 40 may arrive to deposit second incremental amount 42 of chemical-B into second storage tank 32. A second transducer 88, similar to first transducer 82, provides a second signal 90 that indicates how much of chemical-B was added to second tank 32. Signals 84 and 90 may be communicated to a computer 92 or some other component of computer-based system 78 for establishing a record of the chemical deliveries.

Figure 3:
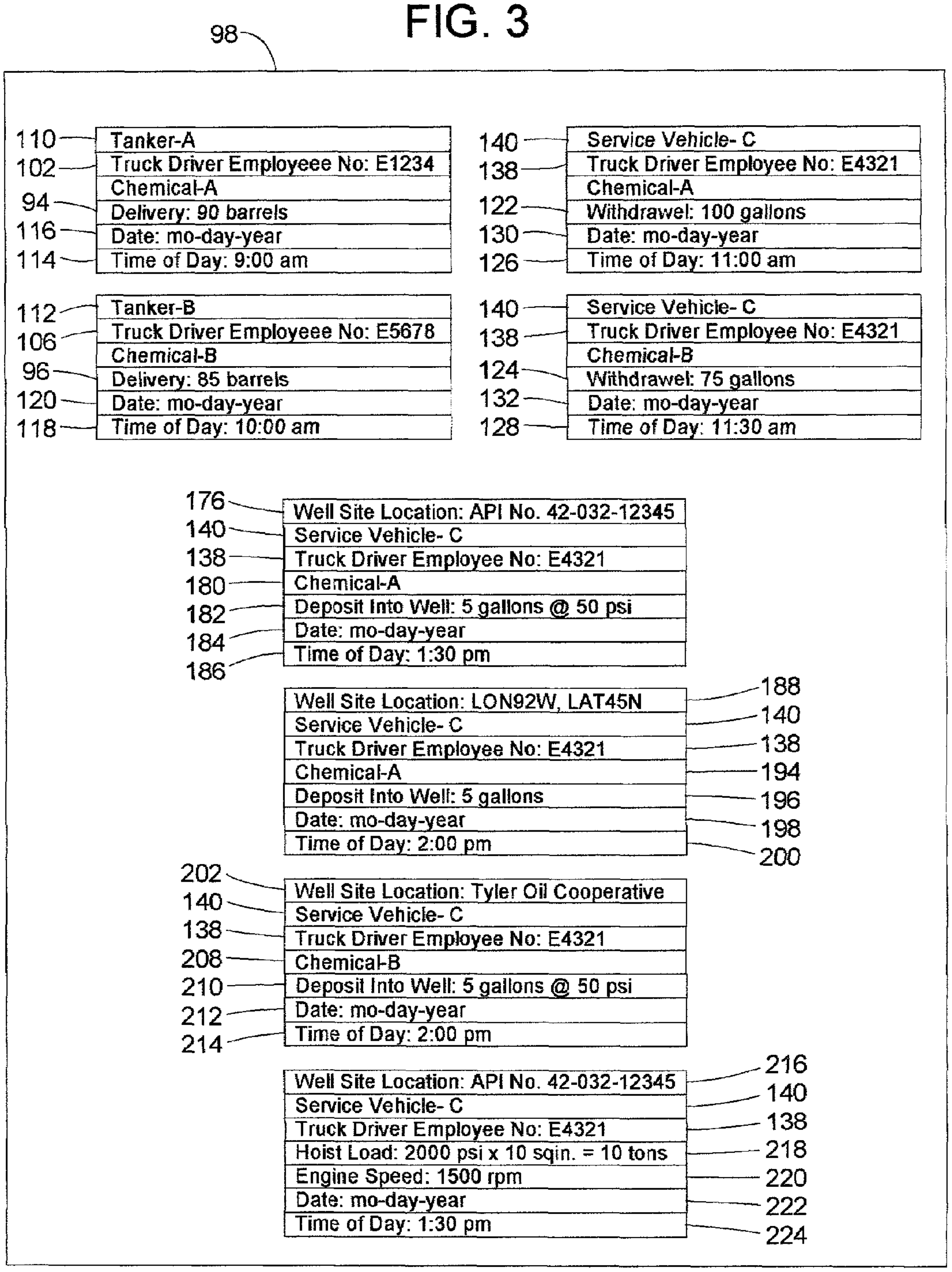
FIG. 3 is an illustrative output provided by the well servicing system of FIG. 1.

Referring further to FIG. 3, computer-based system 78 may convert first signal 84 to a first increment value 94 that indicates the first incremental amount 38 of chemical-A that first tanker 36 deposited into tank 28. Likewise, computer-based system 78 may convert signal 90 to a second increment value 96 that indicates the second incremental amount 42 of chemical-B that second tanker 40 deposited into tank 32. Computer-based system 78 converting a signal to a value is a process well known to those skilled in the art of computers and computer programming. In FIG. 3, incremental values 94 and 96 are shown displayed as part of an output 98 determined by computer-based system 78. The phrase, "determined by computer-based system 78" means that computer-based system 78 affects the outcome of output 98.

Output 98 can provide the basis for creating an ongoing record of chemical inventories of bulk storage station 24 by summing any increment amounts of chemical-A to the initial amount in tank 28. The same applies to chemical-B. Thus, output 98 can provide the basis for creating an ongoing record of a plurality of chemical inventories of bulk storage station 24. Of course, if chemical is removed from the tank, that amount can be subtracted from the calculated inventory level. Output 98 is schematically illustrated to represent any visual display of information. Examples of output 98 include, but are not limited to, a paper printout or some type of optical display such as a computer monitor. Output 98 may be provided directly or indirectly by computer 92 or may be provided by another component of computer-based system 78.

In some cases, computer-based system 78 includes a first input device 100 (e.g., a radio frequency identification device commonly known as an RFID device, a keyboard of computer 92, a barcode scanner, etc.) for receiving a first employee identification value 102 (e.g., an alphanumeric value) of first trucker 36. Similarly, computer-based system 78 may include a second input device 104 for receiving a second employee identification value 106 of second trucker 86. To serve as an example, a wireless communication link 108 is shown associated with second input device 104, wherein second input device 104, in this case, represents an RFID receiver or a barcode scanner and link 108 represents information being conveyed from an IC chip or barcode on a trucker's employee identification card to input device 104. Once inputted into computer-based system 78, output 98 can display the employee identification values, as shown in FIG. 3.

Similar to inputting employee identification values, company identification values 110 and 112 can also be inputted into computer-based system 78. Also, a clock 114 of computer-based system 78 may generate a time-of-day stamp 114 and a date stamp 116 to record when chemical-A was delivered. Stamps 114 and 116 can be triggered by various events, examples of which include, but are not limited to, changes in first signal 84 or inputting of an employee or company identification value. Likewise, another time-of-day stamp 118 and another date stamp 120 can be provided for the delivery of chemical-B.

At bulk storage station 24, service vehicle 12 may arrive to transfer first extracted amount 44 of chemical-A from first storage tank 28 into first shipping tank 20. Also, second extracted amount 48 of chemical-B may be transferred from second storage tank 32 into second shipping tank 22.

As the liquid levels in storage tanks 28 and 32 drop, signal 84 allows computer-based system 78 to derive a first decrement value 122 that indicates the first extracted amount 44 of chemical-A, and signal 90 allows computer-based system 78 to derive a second decrement value 124 that indicates the second extracted amount 48 of chemical-B. Clock 114 of computer-based system 78 may generate additional time-of-day stamps 126 and 128 and date stamps 130 and 132 to establish approximately when vehicle 12 received the chemicals. Stamps 126, 128, 130 and 132 can be triggered by various events, examples of which include, but are not limited to, changes in signals 84 or 90, the actuation of valves 134 and 136, inputting into computer-based system 78 an employee identification value 138 of trucker 54 or inputting a company identification value 140 associated with service vehicle 12.

Referring to FIG. 2, after replenishing the service vehicle's supply of chemicals, vehicle 12 may travel from bulk storage station 24 to well site 16 to pump the chemicals into well 14. At well site 16, trucker 54 actuates parking brake system 59, which produces signal 142 that initiates a reading of GPS device 76 (reading signal 144). Signal 144 may be a latitude/longitude reading that is conveyed to computer based-system 78 by way of an information conveyor 146.

The term, "information conveyor" refers to any device that facilitates the transferring or communicating of information (e.g., data, signals, values, etc.) to, from, and/or through computer-based system 78. Examples of information conveyor 146 include, but are not limited to, A/D converter, DAQ or data acquisition card of a computer, personal computer, PC, desktop computer, laptop computer, notebook computer, handheld computer, portable computer, PDA device, PLC, data logger, etc.

In a currently preferred embodiment of the invention, computer-based system 78 includes a computer 148 that is transported by service vehicle 12. In some cases, computer 148 comprises a TDS2020 CPU (central processing unit) from Triangle Digital Systems of Harlow, England. Included with the CPU is circuitry (e.g., DAQ or I/O board) that serves as information conveyor 146, wherein the circuitry receives signal 144 from GPS device 76 and other signals from various transducers, and conveys the signals in a digital format that computer 148 can process into various values.

Line 150 schematically represents a path of communication for transferring information between various components of computer-based system 78. For example, information may be transferred between information conveyor 146 and other parts of computer 148, transferred from computer 148 to output 98, transferred from computer 92 to output 98, transferred between information conveyor 146 and computer 78, and/or transferred between computers 92 and 148.

When transferring information from one component of system 78 to another (e.g., transferring information from information conveyor 146 to computer 92), the mode of information transfer may comprise a variety of modes, examples of which include, but are not limited to, electromagnetic waves, light beam, infrared, microwave, hard wiring, modem/Internet, or even just physically carrying a data device from one component of system 78 to another (e.g., carrying a data device from information conveyor 146 to computer 92). Examples of such a data device include, but are not limited to a personal computer, PC, desktop computer, laptop computer, notebook computer, handheld computer, portable computer, PDA device, PLC, data logger, magnetic memory disc (e.g., floppy disc), an optical disc (e.g., CD or DVD), IC memory device (e.g., flashcard), etc.

In the case where information conveyor 146 is provided by circuitry of computer 148, signal 144 from GPS device 76, signal 142 from parking brake system 59, and signals 152, 154, 156, 158, 160, 162, and 163 from various transducers associated with service vehicle 12 may be inputted into computer 148 through information conveyor 146. In some cases, signal 152 is provided by a transducer 164 schematically illustrated to represent a pressure sensor or a flow meter that senses the flow of chemical through line 62 that feeds into well 14. Signal 154 may be provided by a transducer 166 schematically illustrated to represent a flow meter, pressure switch or counter (that counts the number of pump strokes), wherein signal 154 changes in response to changes in the flow of chemical through pump 60. Signals 156 and 158 may be provided by conventional control outputs that determine whether valve 168 or 170 is open. Signal 160 may be provided by a transducer 172 schematically illustrated to represent a pressure sensor or strain gage, wherein signal 160 changes in response to changes in the load applied to hoist 18. Signal 162 may be provided by a transducer 174 that varies signal 162 in response to changes in the rotational speed of engine 58. Examples of transducer 174 include, but are not limited to, a magnetic pickup, a tachometer, or a voltmeter that measures a generated voltage associated with engine 58. Signal 163 may be provided by an input device 105 (e.g., similar to input device 104 at bulk storage station 24), wherein signal 163 is employee identification value 138 of trucker 54 or company identification value 140 of the company associated with service vehicle 12.

Output 98 of FIG. 3 indicates service vehicle 12 visited four different well sites besides stopping at bulk storage station 24. At well site 16, actuation of parking brake 56 causes switch 57 to create signal 142, which commands or triggers computer 148 to determine a location value of well site 16 based on sampling signal 144. Also at well site 16, computer 148 derives a company identification value 140 (derived from signal 163), employee identification value 138 (derived from signal 163), a transducer value 180 (derived from signal 156 or 158) indicating which chemical is being pumped, a transducer value 182 (derived from signals 152 or 154) indicating the amount of chemical-A being pumped. Also, a date stamp 184 and a time-of-day stamp 186 indicating approximately when service vehicle 12 was at well site 16 is provided by a clock associated with computer-based system 148. In this example, location value 176 is in terms of an API number (i.e., a number assigned by the American Petroleum Institute to identify the location of a well). For example, an API number may have ten digits, wherein the digits designate the state, county, and serial number of almost every significant well in the country. The API number may then be cross-referenced (manually or via a computer) to a database that provides additional information about the well.

At well site 26, computer 148 derives a location value 188 of well site 26, company identification value 140, employee identification value 138, a transducer value 194 indicating which chemical-A is being pumped, and a transducer value 196 indicating the amount of chemical being pumped. Also, a date stamp 198 and a time-of-day stamp 200 indicating approximately when service vehicle 12 was at well site 26 is displayed on output 98. In this example, location value 188 is in terms of latitude and longitude, which can be cross-referenced (manually or via a computer) to a database of API numbers that can lead to additional information about the well.

At a third well site, computer 148 derives a location value 202 of the third well site, company identification value 140, employee identification value 206, a transducer value 208 indicating which chemical is being pumped, and a transducer value 210 indicating the amount of chemical-B being pumped. Also, a date stamp 212 and a time-of-day stamp 214 indicating approximately when service vehicle 12 was at the well site is displayed on output 98. In this example, location 202 is the name of the company that owns the well, which can be cross-referenced (manually or via a computer) to a database that provides additional information about the well.

At a fourth well site, computer 148 derives a location value 216 of the fourth well site, company identification value 140, employee identification value 138, a transducer value 218 indicating a load placed on hoist 18, and a transducer value 220 indicating the rotational speed of engine 58 (derived from signal 162). Also, a date stamp 222 and a time-of-day stamp 224 indicating approximately when service vehicle 12 was at the well site is displayed on output 98. In this example, location value 216 is in terms of an API number.

When output 98 is in a printed format, it should be noted that the various values may be displayed on a single page or each value may be printed on a separate page. Likewise, when output 98 is displayed on a monitor/display of computer 92 or 148, the various values may be displayed on a single view or each value may be independently displayed on separate views. When displayed separately, the various values may still remain in association with each other in that a user can simply page-up or page-down sequentially through the output and readily determine that the values go with each other. The association of two elements means that the elements are in some way related, share something in common, or simply go with each other.

When output 98 is displayed on a monitor/display of computer 148, the monitor is preferably a fluorescent vacuum display, such as those provided by Noritake Company, Inc. of Noritake, Japan (near Nagoya). The display is available in different colors, but is often a greenish display visible even in bright sunlight. The generally flat display does not deteriorate under heat or sunlight as readily as other more conventional monitors, such as those found on many laptop computers or those using crystal technology. One example of a Noritake fluorescent vacuum display is a part number CU20049SCPB-T22A.

Although the invention is described with reference to a preferred embodiment, it should be appreciated by those skilled in the art that various modifications are well within the scope of the invention. For example, computer-based system 78 may assume a wide variety of configurations, wherein the various components of system 78 may be rearranged or combined, and the actual number of components of system 78 may be more or less than those shown. Therefore, the scope of the invention is to be determined by reference to the claims that follow.

I claim:

1. A well servicing system operable at a well site location that is remote relative to a second location, wherein a well is located at the well site location, the well servicing system comprising:

a plurality of storage tanks storing a plurality of chemicals at the second location;

a service vehicle having a plurality of shipping tanks for transporting the plurality of chemicals from the second location to the well site and for pumping the plurality of chemicals into the well;

a parking brake system disposed on the service vehicle, wherein the parking brake system can be actuated to help hold the service vehicle in place;

a GPS device carried by the service vehicle and providing a GPS signal that indicates the service vehicle is at the well site location; and a computer-based system electrically coupled to the GPS device and responsive to the parking brake system being actuated, such that the computer-based system acts upon the GPS signal in response to the parking brake being actuated.

2. The well servicing system of claim 1, wherein the service vehicle comprises:

an engine that powers the service vehicle as the service vehicle travels from the second location to the well site location;

a hydraulic pump powered by the engine;

a hydraulic motor driven by the hydraulic pump; and a chemical pump driven by the hydraulic motor, wherein the chemical pump is what pumps the plurality of chemicals into the well.

3. The well servicing system of claim 1, further comprising a transducer carried by the service vehicle from the second location to the well site location, wherein the transducer provides a transducer signal that varies in response to pumping the plurality of chemicals into the well.

4. The well servicing system of claim 3, wherein the transducer is a pressure sensor.

5. The well servicing system of claim 3, wherein the transducer is a flow meter.

6. The well servicing system of claim 3, wherein the transducer is a counter.

7. The well servicing system of claim 3, wherein the service vehicle includes a plurality of valves and the transducer signal varies with the selective opening and closing of the plurality of valves.

8. The well servicing system of claim 3, wherein the computer-based system is electrically coupled to the transducer, such that the GPS signal and the transducer signal are communicated to the computer-based system, and wherein the well servicing system further comprises:

a location value derived by the computer-based system and corresponding to the GPS signal;

a transducer value derived by the computer-based system and corresponding to the transducer signal; and an output determined by the computer-based system, wherein the output displays the transducer value in association with the location value.

9. The well servicing system of claim 8, wherein the computer-based system includes a time-of-day clock to establish a first time stamp that identifies when the parking brake is actuated, wherein the output further displays the time stamp.

10. The well servicing system of claim 1, wherein the output is a vacuum fluorescent display.

11. A well servicing system operable at a well site location that is remote relative to a second location, wherein a well is located at the well site location, the well servicing system comprising:

a service vehicle having traveled from the second location to the well site location, wherein the service vehicle assists in performing a service operation on the well at the well site location;

a GPS device being carried by the service vehicle from the second location to the well site location, wherein the GPS device provides a GPS signal that indicates that the service vehicle is at the well site location;

a transducer carried by the service vehicle from the second location to the well site location, wherein the transducer provides a transducer signal that varies upon performing the service operation on the well;

a computer-based system electrically coupled to the GPS device and the transducer, such that the GPS signal and the transducer signal are communicated to the computer-based system;

a location value derived by the computer-based system and corresponding to the GPS signal;

a transducer value derived by the computer-based system and corresponding to the transducer signal; and an output determined by the computer-based system, wherein the output displays the transducer value in association with the location value, whereby the output indicates that the service operation was performed at the well site.

12. The well servicing system of claim 11, wherein the location value is in terms of latitude and longitude.

13. The well servicing system of claim 11, wherein the location value is in terms of an API number.

14. The well servicing system of claim 11 wherein the location value is in terms of a well name.

15. The well serving system of claim 11, wherein the output is a printed report.

16. The well servicing system of claim 11, wherein the output is a monitor.

17. The well servicing system of claim 16, wherein the monitor is a vacuum fluorescent display.

18. The well servicing system of claim 11, wherein the output is created at the well site location.

19. The well servicing system of claim 11, wherein the output is located beyond the well site location.

20. The well servicing system of claim 11, wherein the computer-based system includes a PDA device.

21. The well servicing system of claim 11, wherein the computer-based system includes a portable computer.

22. The well servicing system of claim 11, wherein the computer-based system includes a magnetic memory disc that stores the location value and the transducer value.

23. The well servicing system of claim 11, wherein the computer-based system includes an optical disc that stores the location value and the transducer value.

24. The well servicing system of claim 11, wherein the computer-based system includes a data logger.

25. The well servicing system of claim 11, wherein the service vehicle includes a parking brake system electrically coupled to the computer-based system, such that actuation of the parking brake triggers the computer-based system to register a reading of the GPS signal.

26. The well servicing system of claim 11, wherein the service vehicle includes a hoist that helps in performing the service operation.

27. The well servicing system of claim 11, wherein the service vehicle includes a liquid pump that helps in performing the service operation, wherein the service operation involves pumping a liquid into the well.

28. The well servicing system of claim 27, wherein the service vehicle includes a hydraulic motor that drives the liquid pump.

29. The well servicing system of claim 28, wherein the service vehicle includes an engine that powers the service vehicle as the service vehicle travels from the second location to the well site location, wherein the engine further selectively powers a hydraulic pump that drives the hydraulic motor.

30. The well servicing system of claim 27, wherein the liquid is mostly water.

31. The well servicing system of claim 11, wherein the transducer is a pressure sensor.

32. The well servicing system of claim 11, wherein the transducer is a flow meter.

33. The well servicing system of claim 11, wherein the transducer is a counter.

34. The well servicing system of claim 11, wherein the service vehicle includes an engine and the transducer signal varies with the rotational speed of the engine.

35. The well servicing system of claim 11, wherein the service vehicle includes a plurality of valves and the transducer signal varies with the selective opening and closing of the plurality of valves.

36. The well servicing system of claim 11, wherein the second location includes a plurality of bulk storage tanks for holding a plurality of chemicals, wherein the service vehicle includes a plurality of shipping tanks for transporting the plurality of chemicals from the plurality of bulk storage tanks to the well site location.

37. The well servicing system of claim 11, wherein the second location includes a second well.

38. A well servicing system, for performing a service operation at a well site location that is remote relative to a bulk storage station, wherein a well is located at the well site location, and a first storage tank and a second storage tank are located at the bulk storage station, the well servicing system comprising:

a first tanker containing a first chemical, wherein the first tanker deposits a first incremental amount of the first chemical into the first storage tank, thereby increasing a first stored amount of the first chemical in the first storage tank;

a second tanker containing a second chemical, wherein the second tanker deposits a second incremental amount of the second chemical into the second storage, thereby increasing a second stored amount of the second chemical in the second storage tank;

a service vehicle comprising a first shipping tank and a second shipping tank, wherein the first shipping tank receives a first extracted amount of the first chemical from the first storage tank, the second shipping tank receives a second extracted amount of the second chemical from the second storage tank, and the service vehicle travels from the bulk storage station to the well site to perform the service operation which involves pumping the first chemical and the second chemical into the well;

a first transducer associated with the first storage tank and providing a first signal that varies in response to changing the first stored amount of the first chemical in the first storage tank;

a second transducer associated with the second storage tank and providing a second signal that varies in response to changing the second stored amount of the second chemical in the second storage tank;

a computer-based system in communication with the first transducer and the second transducer such that the computer-based system receives the first signal and the second signal, wherein the computer-based-system includes a time-of-day clock to establish a first time stamp that indicates when the first tanker deposits the first chemical, a second time stamp that indicates when the second tanker deposits the second chemical, and a third time stamp that indicates when the service vehicle receives at least one of the first chemical and the second chemical;

a first increment value derived by the computer-based system and based on the first signal such that the first increment value indicates the first incremental amount of the first chemical that the first tanker deposits into the first storage tank;

a second increment value derived by the computer-based system and based on the second signal such that the second increment value indicates the second incremental amount of the second chemical that the second tanker deposits into the second storage tank;

a first decrement value derived by the computer-based system, wherein the first decrement value indicates the first extracted amount of the first chemical that the service vehicle received from the first storage tank;

a second decrement value derived by the computer-based system, wherein the first decrement value indicates the second extracted amount of the second chemical that the service vehicle received from the second storage tank; and an output determined by the computer-based system, wherein the output displays the first increment value, the second increment value, the first decrement value, the second decrement value, the first time stamp, the second time stamp, and the third time stamp, whereby the output can provide a basis for creating an ongoing record of a plurality of chemical inventories of the bulk storage station.

39. The well servicing system of claim 38, further comprising a GPS device carried by the service vehicle from the bulk storage station to the well site location, wherein the GPS device provides a GPS signal that indicates that the service vehicle is at the well site location.

40. The well servicing system of claim 38, further comprising a third transducer carried by the service vehicle from the bulk storage station to the well site location, wherein the third transducer provides a third signal that varies upon pumping at least one of the first chemical and the second chemical into the well.

41. The well servicing system of claim 38, further comprising:

a third transducer carried by the service vehicle from the bulk storage station to the well site location, wherein the third transducer provides a third signal that varies upon pumping at least one of the first chemical and the second chemical into the well;

a GPS device carried by the service vehicle from the bulk storage station to the well site location, wherein the GPS device provides a GPS signal that indicates that the service vehicle is at the well site location, wherein the computer-based system is electrically coupled to the GPS device and the third transducer, such that the third signal and the GPS signal are communicated to the computer-based system;

a location value derived by the computer-based system and corresponding to the GPS signal; and a transducer value derived by the computer-based system and corresponding to the third signal, wherein the output displays the transducer value in association with the location value.

42. The well servicing system of claim 38, wherein the computer-based system includes an input device for receiving an employee identification value of an employee driving the first tanker, wherein the output displays the employee identification value in association with the first increment value.

43. The well servicing system of claim 42, wherein the input device includes a barcode scanner.

44. The well servicing system of claim 42, wherein the input device involves a wireless communication link.

45. The well servicing system of claim 38, wherein the computer-based system includes an input device for receiving an employee identification value of an employee driving the service vehicle, wherein the output displays the employee identification value in association with the first decrement value.

46. The well servicing system of claim 45, wherein the input device includes a barcode scanner.

47. The well servicing system of claim 46, wherein the input device involves a wireless communication link.

48. The well servicing system of claim 38, wherein the computer-based system includes an input device for receiving a company identification value of a company associated with the first tanker, wherein the output displays the company identification value in association with the first increment value.

49. The well servicing system of claim 48, wherein the input device includes a barcode scanner.

50. The well servicing system of claim 48, wherein the input device involves a wireless communication link.

51. The well servicing system of claim 38, wherein the computer-based system includes an input device for receiving a company identification value of a company associated with the service vehicle, wherein the output displays the company identification value in association with the first decrement value.

52. The well servicing system of claim 51, wherein the input device includes a barcode scanner.

53. The well servicing system of claim 51, wherein the input device involves a wireless communication link.

54. The well servicing system of claim 41, wherein the location value is in terms of latitude and longitude.

55. The well servicing system of claim 41, wherein the location value is in terms of an API number.

56. The well servicing system of claim 41, wherein the location value is in terms of a well name.

57. The well serving system of claim 38, wherein the output is a printed report.

58. The well servicing system of claim 38, wherein the output is a monitor.

59. The well servicing system of claim 58, wherein the monitor is a vacuum fluorescent display.

60. The well servicing system of claim 38, wherein the output is created at the well site location by way of the service vehicle.

61. The well servicing system of claim 38, wherein the output is located beyond the well site location.

62. The well servicing system of claim 38, wherein the computer-based system includes a PDA device.

63. The well servicing system of claim 38, wherein the computer-based system includes a portable computer.

64. The well servicing system of claim 41, wherein the computer-based system includes a magnetic memory disc that stores the location value and the transducer value.

65. The well servicing system of claim 41, wherein the computer-based system includes an optical disc that stores the location value and the transducer value.

66. The well servicing system of claim 38, wherein the computer-based system includes a data logger.

67. The well servicing system of claim 41, wherein the service vehicle includes a parking brake system electrically coupled to the computer-based system such that the computer-based system registers a GPS reading upon actuating the parking brake.

68. The well servicing system of claim 38, wherein the service vehicle includes a liquid pump driven by a hydraulic motor.

69. The well servicing system of claim 68, wherein the service vehicle includes an engine that powers the service vehicle as the service vehicle travels from the bulk storage station to the well site location, wherein the engine further selectively powers a hydraulic pump that drives the hydraulic motor.

70. The well servicing system of claim 38, wherein the second chemical is mostly water.

71. The well servicing system of claim 41, wherein the third transducer is a pressure sensor.

72. The well servicing system of claim 41, wherein the third transducer is a flow meter.

73. The well servicing system of claim 41, wherein the third transducer is a counter.

74. The well servicing system of claim 41, wherein the service vehicle includes a plurality of valves and the transducer signal varies with the selective opening and closing of the plurality of valves.

* * * * *

UNITED STATES PATENT AND TRADEMARK OFFICE

CERTIFICATE OF CORRECTION

PATENT NO. : 7,006,009 B2
DATED : February 28, 2006
INVENTOR(S) : Frederic M. Newman It is certified that error appears in the above-identified patent and that said Letters Patent is hereby corrected as shown below:

Title page,
Item [74], should read:
-- *Attorney, Agent, or Firm* - King & Spalding LLP --.

Signed and Sealed this

Eighteenth Day of April, 2006

JON W. DUDAS
*Director of the United States Patent and Trademark Office*